Figure 1:
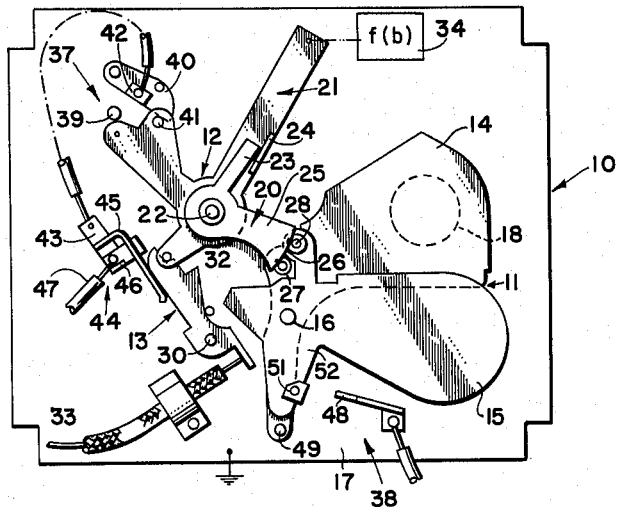

July 5, 1966　　　　　　S. KAGAN　　　　　　3,259,042
REMOTE CONTROLLED FLASH PHOTOGRAPHY SYSTEM Filed Dec. 4, 1963　　　　　　　　　　　　2 Sheets-Sheet 1

INVENTOR.
Sholly Kagan
BY Brown and Mikulka
and
Ronald M. Sandler
ATTORNEYS

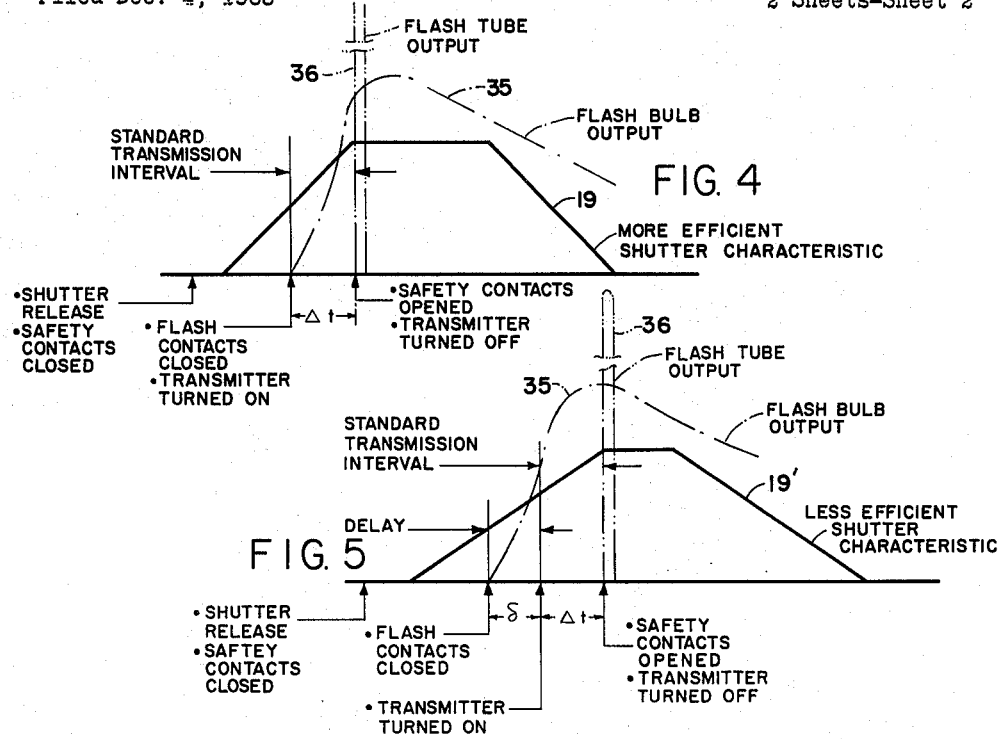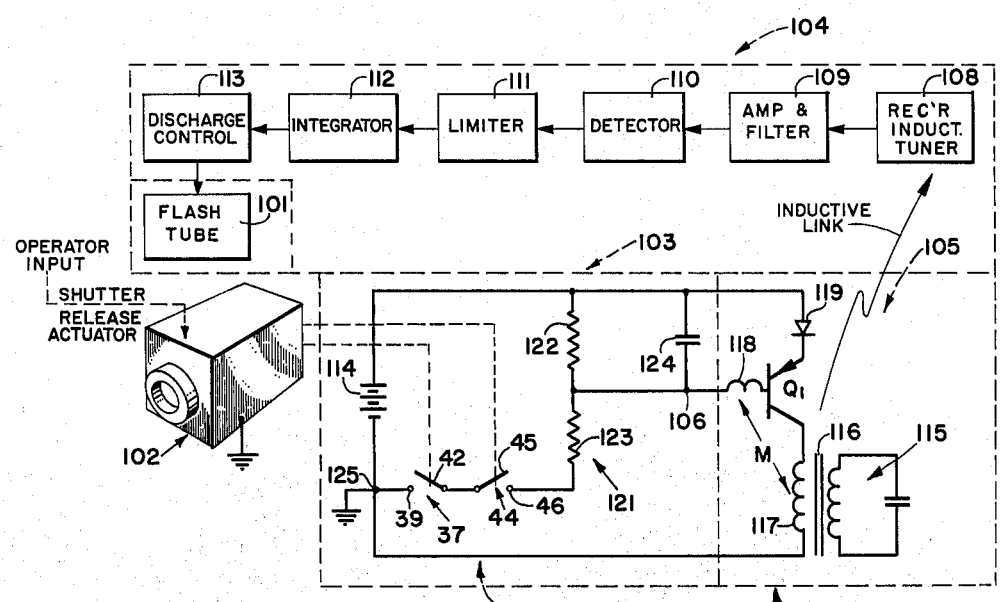

United States Patent Office 3,259,042
Patented July 5, 1966

3,259,042
REMOTE CONTROLLED FLASH PHOTOGRAPHY SYSTEM
Sholly Kagan, Natick, Mass., assignor to Polaroid Corporation, Cambridge, Mass., a corporation of Delaware
Filed Dec. 4, 1963, Ser. No. 328,043
7 Claims. (Cl. 95—11.5)

This invention relates generally to electronic flash photography apparatus of the type remotely controlled via a control signal broadcast from the camera; and more particularly to apparatus of the type described wherein interference is suppressed by utilizing a receiver constructed to cause ionization of the flash tube at the end of an uninterrupted burst of the control signal that lasts a predetermined time, the initiation of the broadcast of the control signal being determined by the shutter movement so that the flash occurs at maximum shutter opening.

Triggering conventional electronic flash apparatus connected to a camera by a cable is generally accomplished by providing, in the shutter mechanism, a pair of contacts (termed "X" contacts for reference) which are closed by the movement of the shutter to its position of maximum opening causing a trigger voltage to be applied to the tube. Because ionization of the flash tube is instantaneous with the application of the trigger voltage, the pulse of light emitted by the tube upon ionization occurs at maximum shutter opening. In most cameras, the shutter speed is kept fixed, and correct exposure is achieved by adjusting the exposure aperture in relation to the distance of the subject being photographed from the camera. A flash tube remotely located relative to the camera can be triggered by a radio signal broadcast from the camera in response to the closing of the "X" contacts, since the flash still will occur simultaneously with the closing of the contacts (i.e., at maximum shutter opening) because the signal is propagated from the camera to the remote flash tube at the speed of light. However, this approach is severely limited by the fact that spurious signals, unrelated to the position of the shutter, will trigger the flash. For this reason, those skilled in the art have resorted to various coding techniques for suppressing response of the flash tube to all but special signals. One particularly simple and reliable technique, disclosed and claimed in copending application Serial No. 203,988, filed June 20, 1962, now Patent No. 3,185,056, and assigned to the same assignee as this application, involves the use of an induction field link in the VLF region of the spectrum, to permit miniaturization of the antennae at the camera and the receiver, and a receiver which triggers the flash tube at the end of a burst of signal that lasts a predetermined time. In other words, for a signal to result in the flash tube producing a pulse of light, such signal must be at the proper frequency and have an uninterrupted duration no less than a predetermined time, the receiver triggering the flash tube at the end of such time. Essentially, then, this technique requires a transmitter at the camera capable of generating a sustained induction field at the desired frequency for a predetermined time prior to maximum shutter opening.

Fortunately, most cameras are provided with a pair of contacts (termed "M" contacts for reference) which close a short time prior to maximum shutter opening, and by using this time interval to establish the predetermined time required by the receiver, the "M" contacts offer a convenient way to initiate operation of the transmitter. In this manner, the flash tube will be ionized at the instant of maximum shutter opening. In order to apply this technique to existing cameras utilizing differently designed shutters, account must be taken of the fact that the time interval between initial closing of the "M" type contacts and the attainment of maximum shutter opening varies with the shutter efficiency of the particular camera (which is to say the rapidity with the exposure aperture is uncovered or covered). This dependency on the shutter efficiency arises because such contacts are normally used to close a circuit by which a vaporizable flash bulb is ignited, the burning characteristics of which are such that the resultant light pulse has a duration comparable to the total time required by the shutter to uncover and then cover the exposure aperture. In order to achieve proper exposure of the scene being photographed the occurrence of the output of the flash bulb must be correlated with the shutter characteristic. In other words, decreasing the shutter efficiency generally requires an increase in the time between ignition (closing of the contacts) and attainment of maximum shutter opening in order for the amount of light passing through the exposure aperture to remain constant. This being the case, the proper instant at which the contacts close relative to maximum shutter opening is designed into each type of camera, there being no concern, prior to the invention disclosed and claimed in copending application Serial No. 203,988, filed June 20, 1962, for the fact that a different time may be associated with each type of camera.

However, this factor, taken with the contemplation that the transmitter is to mate with existing flash gun mountings of a camera, would adversely affect marketing remotely controlled electronic flash apparatus of the type described because it normally would necessitate the manufacture and stocking, for each different type of camera, of a specifically designed transmitter configuration, and a receiver configuration designed to respond to a signal of a different duration. In other words, different transmitters and receivers must be constructed to operate with different types of cameras. The situation would be materially improved were it possible to standardize the receiver design.

It is therefore the primary object of the present invention to permit standardization of the receiver configuration (i.e., the time interval between initiation of transmission and triggering of the flash tube is constant and independent of the type of camera being used) by providing, in remotely controlled apparatus of the type described, a signal-generating device which, in response to initial closing of the flash contacts of the camera, will commence transmission a fixed time prior to maximum shutter opening such that the delay between the initial closing of the contacts and commencement of transmission is easily made to depend on the shutter efficiency.

Briefly, the invention includes an oscillator circuit for initiating, in response to the application of a control voltage thereto, the generation and broadcast to the receiver of a CW signal via an induction field. The control voltage is developed by a control circuit which generates, in response to the closing of the flash contacts, a time variable voltage which reaches the level of the control voltage in a period of time depending upon the parameters of an RC integrator network. Such parameters are selected by the manufacturer to match the shutter efficiency characteristic of the type of camera for which the transmitter is being designed, so that the delay between initial closing of the contacts and commencement of transmission is achieved electronically by the transmitter rather than mechanically by the camera.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

Figure 2:
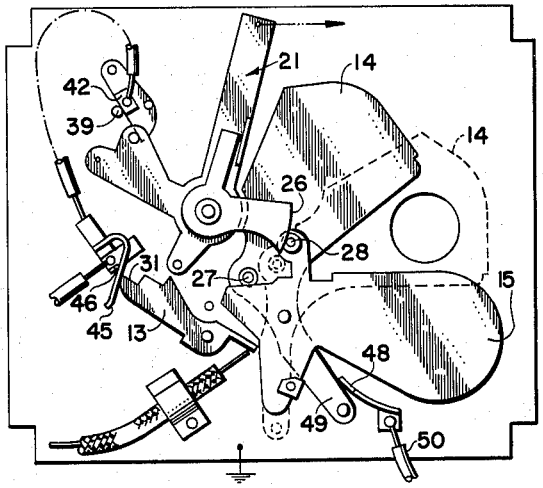
Figure 3:
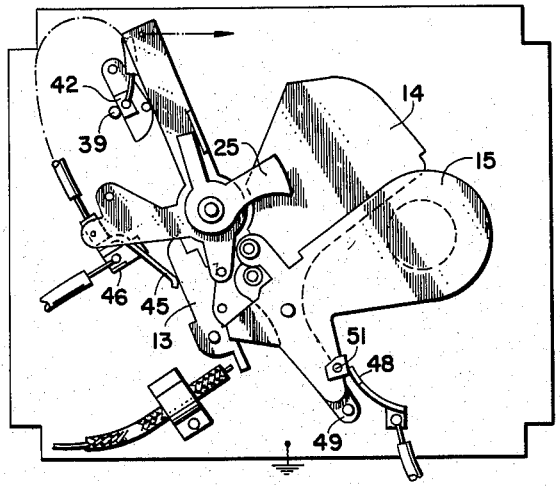

For a fuller understanding of the nature and objects of the invention, reference should be had to the following detailed description taken in connection with the accompanying drawings wherein:

FIGURES 1, 2 and 3 are plan views of a typical camera shutter mechanism for the purpose of illustrating the relative positions of the various components constituting the mechanism just prior and subsequent to completion of exposure;

FIGS. 4 and 5 are time diagrams for the purpose of illustrating the correct synchronization of the output of a vaporizable flash bulb and a discharge type flash tube with shutter characteristics of the type developed by a relatively more efficient and a relatively less efficient shutter mechanism, one of which is similar to that shown in FIGS. 1, 2 and 3; and FIG. 6 is a schematic diagram of electronic flash apparatus into which the present invention is incorporated and associated with a camera having a shutter mechanism of the type shown in FIGS. 1, 2 and 3.

Referring now to the drawings, reference numeral 10 designates a typical camera shutter mechanism which is discussed only for the purpose of illustrating the manner in which the closing of "M" and "X" type contacts may be related to the shutter movement, the invention not being dependent upon the specific nature of the mechanism by which synchronization is achieved. Essentially, mechanism 10 includes shutter means 11, shutter operator means 12, and shutter release lever 13. Shutter means 11 includes opening blade 14 and closing blade 15, each pivotably mounted for rotation about stud 16 rigidly attached to housing 17 containing exposure aperture 18. Blade 14 has a blocking position covering the aperture (FIGURE 1) and an unblocking position uncovering the aperture (FIGS. 2 and 3), while blade 15 has an unblocking position uncovering the aperture (FIGURE 1) and a blocking position covering the aperture (FIGS. 2 and 3). Spring means (not shown) constantly urges the opening blade from blocking to unblocking position to initiate exposure and the closing blade from unblocking to blocking position to terminate exposure. Because of the finite time required to uncover and cover the aperture the light able to pass through will vary with time generally in the manner shown by curve 19 in FIG. 4.

Returning now to FIGS. 1–3, shutter operator means 12 includes cam means 20 and cam operator means 21, both of which are rotatably mounted on stud 22 rigidly attached to housing 17. A torsion spring (not shown) between means 20 and 21 urges arm 23 on means 20 into engagement with flange 24 on means 21 to permit resilient pivotal relative movement in one direction between means 20 and 21. Another torsion spring (not shown) between means 21 and the housing urges means 21 (and means 20 as a result of flange 24) from its cocked position (FIGURE 1), toward its intermediate position (FIG. 2) and to its uncocked position (FIG. 3). However, lever 13 rotatably mounted on stud 30 and having notch 31 in one end is urged by a spring (not shown) into latching contact with pin 32 on means 21 such that the latter is releasably maintained in cocked position.

Depression of the shutter release button of the camera (not shown) by an operator imparts movement to flexible cable 33 which actuates the shutter means by pivoting lever 13 out of latching contact with pin 32 (FIG. 2). Upon release of the shutter button, spring means (not shown) returns the cable to the position shown in FIGS. 1 and 3 permitting lever 13 to return under spring bias, to the position shown in FIGS. 1 and 3. When means 21 is in its cocked position (FIGURE 1), arm 25 on means 20 and having an arcuate follower face 26, engages cam roller 27 on opening blade 14 for maintaining the latter in blocking position, and cam roller 28 on closing blade 15 for maintaining the latter in unblocking position. When means 21 moves to its intermediate position (FIG. 2), only roller 28 remains engaged with face 26 for maintaining the closing blade in unblocking position and roller 27, being disengaged from face 26, permits the opening blade to move to its unblocking position thereby initiating exposure. When means 21 moves to its uncocked position (FIG. 3) cam means 20 is moved until face 26 no longer engages roller 28, thereby permitting the closing blade to move to blocking position and terminate exposure.

As shown in FIG. 4, there is a small delay subsequent to shutter release, i.e., pivotal movement of lever 13 out of engagement with pin 32 of means 21 before the opening blade begins to uncover the exposure aperture. The amount of light passed through the aperture by the shutter means is the area under curve 19. The latter is determined by the time required for means 21 to pivot from its cocking position to its uncocking position. This in turn is controlled by mechanical means 34 which may be manually set to exert a predetermined force on means 21 that opposes the torsion force thereon tending to move it to its uncocked position. In a relatively efficient shutter mechanism such as shown in FIG. 4, the order of magnitude of the time between shutter release and maximum shutter opening may be approximately 10 milliseconds, while in a less efficient shutter mechanism, such as shown in FIG. 5, the time may be as long as 20 milliseconds.

Superimposed on shutter characteristic curve 19 shown in FIG. 4 are light curves representative of properly synchronized transient illumination characteristics representative of a vaporizable flash bulb with shutter characteristics 19 when the amount of light from the flash bulbs permitted by the shutter characteristic to pass through the exposure aperture (namely, the area under the curve obtained by multiplying the flash curve and the shutter characteristic) is sufficient to properly expose the film. Because the time required between initial ignition of the vaporizable material in flash bulb and the instant when the ignition is complete and the light reaches a maximum output is of the same order of magnitude as the time required by the opening blade to completely uncover the exposure aperture, it is necessary to initiate ignition a short time prior to maximum shutter opening as shown in FIG. 4. On the other hand, the light output from a discharge type flash tube (curve 36) is essentially an impulse, which means that the light pulse is very narrow with a very high intensity. The output from a discharge type flash tube has this characteristic because ionization of the tube is completed substantially instantaneously with the application of a trigger voltage. Flash tube output 36 is synchronized with shutter characteristic 19 when the impulse occurs during the time that the shutter blade is in its maximum opening position. In order to permit a given shutter mechanism to be synchronized with either the output of a vaporizable flash bulb or a discharge type flash tube it is necessary for the shutter mechanism to include at least two sets of switches: one set ("M" type contacts) for initiating ignition of a vaporizable flash bulb a predetermined period prior to maximum blade opening, and another set ("X" type contacts) for triggering the flash tube at the instant of maximum shutter opening.

Referring back to FIGS. 1–3, the shutter mechanism shown therein is provided with "M" type contacts 37 and "X" type contacts 38. Contacts 37 include a terminal 39 rigidly attached to housing 17 and constituting a ground reference for the electrical system. Rotatably mounted adjacent terminal 39 is nonconducting arm 40 urged by a spring (not shown) toward engagement with terminal 39. Pin 41 attached to means 21 separates contact 42 mounted on arm 40 from terminal 39 when means 21 is in the position shown in FIGURE 1, which is to say, prior to the initiation of exposure. As means 21 moves toward its intermediate position shown in FIG. 2 at which exposure is initiated by the movement of the opening blade to its unblocking position, pin 41 has moved sufficiently far to permit contact 42 to engage terminal 39 thus connecting the electrical ground to terminal 43 of safety switch 44. The geometry of the movable parts is such that contact 42 engages terminal 39 at a predetermined time prior to the movement of opening blade 14 to its unblocking position, and by proper design such predetermined time can be matched to a flash bulb characteristic. Terminal 43 is insulated from housing 17 and from conducting arm 45 which resiliently engages lever 13. The pivotal movement of lever 13 to its unlatching position shown in FIG. 2 resiliently deforms conducting arm 45 into engagement with lug 46 which is electrically connected to terminal 43 and wire 47. However, the positioning of safety switch 44 relative to lever 13 is such that terminal 43 is electrically connected to wire 47 prior to the time that contact 42 engages terminal 39. When lever 13 is released and returns to the position shown in FIG. 3 (that is, subsequent to termination of exposure) safety switch 44 is opened thereby removing the ground connection from terminal 43. In this manner wire 47 is grounded only as long as necessary to insure proper ignition of the vaporizable flash bulb which is connected in series with wire 47.

"X" contacts 38 include a resilient arm 48 mounted on housing 17, but insulated therefrom, and in the path of movement of arm 49 which is a part of opening blade 14. The positioning of arm 48 relative to arm 49 is such that the two arms contact each other at the instant the opening blade has completely uncovered exposure aperture 18 as shown in FIG. 2. This contact between the two arms connects lead 50 to ground and can be used to trigger a discharge type flash tube. A safety switch is provided in this circuit and operates when nonconducting block 51 attached to arm 52 of closing blade 15 engages arm 48 and cams the latter out of engagement with arm 49 of the opening blade thereby disconnecting the ground connection from lead 50.

As previously indicated, the shutter characteristic (curve 19') shown in FIG. 5 is for a less efficient shutter mechanism than the mechanism whose characteristic is shown at 19 in FIG. 4. However, this is not to suggest that the shutter mechanism of FIGS. 1-3 is the most efficient shutter mechanism or that the present invention is limited to shutter mechanisms having the exact characteristic shown in FIGS. 4 and 5. What is intended to be illustrated by FIGS. 4 and 5 is the reason why ignition of a vaporizable flash bulb must occur a longer period of time prior to maximum shutter opening for a relatively less efficient shutter mechanism (curve 19') than for a relatively more efficient mechanism (curve 19). First, it must be realized that with both types of shutter mechanism set for the same speed and same diaphragm, the amount of light, under steady-state light conditions, passed by each mechanism will be the same. That is to say, the area under curve 19 is equal to the area under curve 19'. If the amount of light for proper exposure is passed by the mechanism whose characteristic is illustrated at 19 when a flash bulb having an output characteristic as indicated at 35 is ignited at time $\Delta_t$ seconds before maximum blade opening, it is believed intuitively obvious that a different amount of light would be passed were the mechanism to have a characteristic as illustrated at 19'. In view of this and the fact that the mechanism of FIG. 4 is at maximum blade opening for a longer period of time than the mechanism of FIG. 5 while the light output of the bulb is at its maximum, it follows that the mechanism of FIG. 5 will admit less light to the film than FIG. 4. Therefore, to cause the mechanism of FIG. 5 to admit the same amount of light, it is necessary to advance ignition relative to maximum shutter opening, and this is illustrated by causing ignition to commence a time $\delta + \Delta_t$ seconds prior to maximum shutter opening.

As indicated previously, FIGS. 4 and 5 illustrate but two of many types of shutter characteristics represented by millions of existing cameras owned by the public and but two different time intervals between the closing of a pair of "M" contacts and the attainment of maximum shutter opening necessary to achieve proper exposure under flash bulb conditions. Such different intervals create a problem when it is desired to adapt a number of different types of shutter mechanisms to standardized interference-suppressed electronic flash photography apparatus of the type described in copending application Serial No. 203,988, filed June 20, 1962. The latter discloses flash apparatus of the type wherein the flash tube is remote from the camera and synchronization of the flash impulse with maximum shutter blade opening is achieved via a radio signal broadcast from the camera. Spurious outputs from the flash tube are suppressed by causing the receiver to trigger the tube only in response to a received CW signal having a duration no less than a fixed interval of time. Since the "M" contacts close sometime prior to maximum shutter blade opening, and remain closed until maximum blade opening is achieved, they provide a convenient way to initiate and sustain a CW signal. The problem is to cause the transmitter to be keyed said fixed time before maximum shutter opening occurs regardless of when the "M" contacts are closed, and it is this problem to which the present invention is directed.

Accordingly, reference is now made to FIG. 6 wherein numeral 100 designated interference-suppressed electronic flash apparatus wherein flash tube 101 is remote from camera 102, and synchronization of the output from the flash tube with the opening of the shutter is achieved via a radio signal broadcast from the camera location to the remote location of the flash tube. Flash apparatus 100 includes transmitter means 103 physically attached or electrically connected to camera 102, receiver means 104 and flash tube 101. Transmitter means 103 includes oscillator means 105 responsive to a control voltage at node 106 for generating a CW signal while the control voltage is present and transmitting said signal to receiver means 104; and control means 107 responsive to the initial closing of "M" contacts 37 (safety switch 44 being previously closed) for developing said control voltage at node 106 without interruption despite intermittent opening and closing of contacts 37.

Receiver means 104 includes antenna-tuner assembly 108 for receiving the signal broadcast from oscillator means 105; circuit 109 for amplifying and filtering the output of assembly 108 to obtain the CW signal; detector 110 whose output is a pulse commencing when switch 37 is closed and ending when safety switch 44 is opened (provided, of course, that the output of oscillator means 105 is continuous during the interval); limiter 111 for limiting the amplitude of the pulse out of detector 110; integrator 112 for integrating the amplitude-limited pulse and providing a time varying voltage that reaches a trigger level only if the pulse out of detector 110 is continuous; and discharge control means 113 for causing flash tube 101 to be ionized when the trigger level is reached thereby causing the impulse of light from the tube to occur at maximum shutter opening. Details of the construction and operation of receiver 104 are disclosed in copending application Serial No. 203,988, filed June 20, 1962.

Oscillator means 105 comprises transistor Q1 arranged in a circuit that provides amplification and regenerative feedback, the necessary D.C. bias voltages for oscillations to exist being furnished by battery 114 and control means 107. Specifically, the frequency-determining element may include L–C tank circuit 115 tuned to a frequency in the VLF region of the spectrum, wherein the inductance is constituted by a coil wound on unshielded ferrite core 116 that constitutes the antennae of the transmitter means. Tank circuit 115 is coupled to transistor Q1 by coil 117 also wound on core 116 and connected between the collector electrode of Q1 and one side of battery 114. Regenerative feedback is established by coil 118 also wound on core 116 and connected between the base electrode and node 106 of control means 107. The emitter electrode is coupled to the other terminal of battery 114 through diode 119 whose polarity is the same as the polarity of the base-emitter junction.

With switches 37 and 44 in their open position as shown in FIG. 6, one side of battery 114 is applied to both the base and emitter sides of the transistor configuration, while the other side of the battery is connected to the collector. The polarity of the battery is in the direction to forward bias both diode 119 and the emitter-base junction of the transistor, and to reverse bias the collector-base junction. A large leakage current thus tends to flow but the forward characteristic of diode 119 is such that there is a sufficient forward voltage drop thereacross to reverse bias the emitter-base junction thus limiting the flow of leakage current in the configuration. However, when switches 37 and 44 are closed, the voltage at node 106, subject to the influence of capacitor 124, eventually forward biases the emitter-base junction shifting the operating point of diode 119 to a region where its forward resistance is very low. That is to say, the threshold voltage of the diode 119 is eventually exceeded, causing a pronounced increase in the conductivity of the diode 119. Thus, when the transistor is biased for operation, the diode acts as a very small emitter resistor, and when the transistor is back-biased, the diode acts as a very large resistance materially limiting the flow of leakage current.

Control means 107 contains integrator network 121 composed of resistors 122 and 123 connected together at node 106 and shunting battery 114 through switches 37 and 44, and capacitor 124 also connected to node 125 and shunting resistor 122. The purpose served by the integrator network will be apparent from a description of the operation of the circuit. It should be noted first, however, that as long as either switch 37 or 44 is open, the base-emitter junction of Q1 is essentially at ground potential with the result that Q1 is cut-off even though the full battery potential is applied across the collector-emitter electrodes.

When the operator of the camera depresses the shutter release actuator, safety switch 44 closes as the opening blade begins to uncover the exposure aperture. When "M" switch 37 closes, the voltage at node 106 exponentially approaches a voltage determined by the voltage divider defined by resistors 122 and 123, with a time constant determined by the combination of the capacitance of capacitor 124 with the circuit resistance involved in charging the capacitor 124. When the voltage at node 106 reaches a level (termed the trigger voltage) sufficient to forward bias the base-emitter junction and cause Q1 to conduct, the latter quickly switches between saturation and cut-off at a frequency determined by the resonant frequency of tank circuit 115. During a conduction interval, capacitor 124 is shunted by the impedance of the base-emitter branches of the conducting transistor, and this would tend to discharge capacitor 124 and remove the forward bias from Q1 thereby affecting the oscillator frequency. For this reason, the resistance of resistors 122 and 123 are low, each being of the same order of magnitude as the impedance of the emitter and base of the transistor when the latter is conducting. Thus, oscillator means 105 breaks into oscillation a time $\delta$ seconds subsequent the closing of switch 37, and the induction field associated with unshielded core 116 is propagated to a similar unshielded ferrite core located at tuner 108 at the receiver. The particular value of the delay $\delta$ depends on the parameters of the integrator circuit.

For very small $\delta$'s, resistor 123 may be eliminated thereby establishing a smaller time constant for the integrator. In this manner, the duration of the signal at the receiver necessary to trigger the flash tube, namely the burst interval $\Delta_t$, can be established by the closing of the "M" contacts of the most efficient shutter mechanism. All less efficient shutter mechanisms can be used with this receiver by selecting the components of the integrator circuit such that the delay $\delta$ equals the difference between the interval from when the "M" contacts close and when the shutter reaches maximum opening, and the interval $\Delta_t$.

As a specific example of a device actually constructed and capable of achieving the results described, the values of the components in the circuit diagram of FIG. 6 are tabulated below to provide a $\delta = 6$ ms. and a frequency of about 30 kc.:

| Component: | Value |
|---|---|
| Q1 | Transistor. |
| 117 | 7 turns. |
| 118 | 2 turns. |
| 119 | 1N456. |
| 122 | 560 ohms±5%, ¼ w. |
| 123 | 470 ohms±5%, ¼ w. |
| 124 | 20µf±10% 4 v. |
| 114 | 4.5 volt battery. |
| Transistor characteristics: | |
| $V_{ce}$ sat ($I_c=400$ ma., $I_b=20$ ma.) | 0.6 volts. |
| $h_{fe}(I_c=50$ ma., $V_{ce}=1$ volt) | 80–320. |
| $I_{cbo}(V_{cb}=6$ v.) | 15 µa. |
| $I_{ebo}(V_{eb}=10$ v.) | 20 µa. |
| $I_{cer}(V_{ce}=15$ v., $R_{be}=1K$) | 300 µa. |

Those skilled in the art can now appreciate that the present invention discloses network means, namely integrator circuit 121, on which is developed a time variable voltage that reaches the level of a control voltage for activating an oscillator circuit, after a predetermined period that can be easily adjusted by proper selection of parameters.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In combination with a camera having a pair of flash contacts whose closing occurs a predetermined time prior to maximum shutter opening, and flash apparatus remote from the camera responsive to a received burst of CW signal of a certain duration less than said predetermined time for causing said apparatus to produce an impulse of light for illuminating the scene being photographed at the end of said certain duration and coincident with maximum shutter opening, transmitter means for synchronizing initiation of said signal with the closing of said contacts, said transmitter means comprising:

(a) oscillator means responsive to the application of a control voltage thereto for generating and broadcasting a CW signal of said certain duration; and (b) control means for applying said control voltage to said oscillator means after a delay substantially equal to the difference between said predetermined time and said certain duration.

2. Apparatus in accordance with claim 1 wherein said control means includes:

(a) network means connected to said oscillator means and on which is developed a time variable voltage that reaches the level of said control voltage in a period of time, subsequent to the connection of a voltage source thereto, substantially equal to the difference between said predetermined time and said certain time duration; and (b) a voltage source connectable to said network means in response to the closing of said flash contacts.

3. In combination with a camera having a pair of flash contacts whose closing occurs a predetermined time prior to maximum shutter opening, and flash apparatus remote from the camera responsive to a received burst of CW signal of a certain duration less than said predetermined time for causing said apparatus to produce an impulse of light for illuminating the scene being photographed at the end of said certain duration and coincident with maximum shutter opening, transmitter means for synchronizing initiation of said signal with the closing of said contacts, said transmitter means comprising:

(a) signal generating means for generating and radiating output signals in response to the application of a control voltage of a predetermined magnitude across input terminals thereof;
(b) first conductor means for applying electrical excitation to said signal generating means;
(c) second conductor means for connecting said transmitter device to said flash contacts; and
(d) time delay means energizable from said first conductor means through said second conductor means for developing a time variable control voltage across said input terminals of said signal generating means, whereby after a time delay after the closing of said flash contacts dependent on parameters in said delay means, a control voltage of said predetermined magnitude is attained and said signal generating means is turned on.

4. In combination with a camera having a pair of flash contacts whose closing occurs a predetermined time prior to maximum shutter opening, and flash apparatus remote from the camera responsive to a received burst of CW signal of a certain duration less than said predetermined time for causing said apparatus to produce an impulse of light for illuminating the scene being photographed at the end of said certain duration and coincident with maximum shutter opening, transmitter means for synchronizing initiation of said signal with the closing of said contacts, said transmitter means comprising:

(a) signal generating means for generating and radiating output signals in response to the application of a control voltage of a predetermined magnitude across input terminals thereof;
(b) first conductor means for applying electrical excitation to said signal generating means;
(c) second conductor means for connecting said transmitter device to said flash contacts; and
(d) time delay means energizable from said first conductor means through said second conductor means for developing a time variable control voltage across said input terminals of said signal generating means, whereby after a time delay after the closing of said flash contacts dependent on parameters in said delay means, a control voltage of said predetermined magnitude is attained and said signal generating means is turned on, being turned off after a time equal to said preascertained duration.

5. In combination with a camera having a pair of flash contacts whose closing occurs a predetermined time prior to maximum shutter opening, and flash apparatus remote from the camera responsive to a received burst of CW signal of a certain duration less than said predetermined time for causing said apparatus to produce an impulse of light for illuminating the scene being photographed at the end of said certain duration and coincident with maximum shutter opening, transmitter means for synchronizing initation of said signal with the closing of said contacts, said transmitter means comprising:

(a) a normally inactive oscillatory circuit including a transistor and an inductive element for radiating signals generated by said circuit, said circuit becoming oscillatory in response to the application of a control voltage of a predetermined magnitude across input terminals of said transistor;
(b) first conductor means for applying electrical bias excitation to said transistor;
(c) second conductor means for connecting said transmitter device to said flash contacts; and
(d) time delay means energizable from said first conductor means through said second conductor means for developing a time variable control voltage across said input terminals of said signal generating means, whereby after a time delay after the closing of said flash contacts dependent on parameters in said delay means, a control voltage of said predetermined magnitude is attained and said oscillatory circuit means is activated, said circuit being deactivated after a time equal to said preascertained duration by the opening of said flash contacts.

6. The invention defined by claim 5 wherein said time delay means includes an RC network and unidirectional conduction means, said unidirectional conduction means being highly conductive at a voltage threshold of said predetermined magnitude to activate said signal generating means.

7. In combination with a camera having a pair of flash contacts whose closing occurs a predetermined time prior to maximum shutter opening, and flash apparatus remote from the camera responsive to a received burst of CW signal of a certain duration less than said predetermined time for causing said apparatus to produce an impulse of light for illuminating the scene being photographed at the end of said certain duration and coincident with maximum shutter opening, transmitter means for synchronizing initation of said signal with the closing of said contacts, said transmitter means comprising:

(a) a normally inactive oscillatory circuit including a transistor having input, output and common electrodes and an inductive element for radiating signals generated by said circuit, said circuit becoming oscillatory in response to the application of a control voltage of a predetermined magnitude on said input electrode of said transistor;
(b) first conductor means for applying electrical bias excitation to said transistor through said output and common electrodes; and
(c) second conductor means for connecting said transmitter device to said flash contacts; and
(d) time delay means energizable from said first conductor means through said second conductor means, said time delay means including unidirectional conducting means connected to said common electrode of said transistor in the direction of forward current flow in said transistor, said unidirectional conducting means having a voltage threshold of said predetermined magnitude, and an RC network developing an output voltage on said input electrode constituting said control voltage, whereby after a time delay following the closing of said flash contacts dependent on the resistive and capacitive parameters in said network, a control voltage of said predetermined magnitude is attained on said input electrode, causing said unidirectional conduction means and said transistor to conduct and said oscillatory circuit to be activated, said circuit being inactivated after a time equal to said preascertained duration by the opening of said flash contacts.

References Cited by the Examiner
UNITED STATES PATENTS

| | | | |
|---|---|---|---|
| 2,408,764 | 10/1946 | Edgerton | 95—11.5 |
| 2,419,978 | 5/1947 | Wildman | 95—11.5 |
| 3,063,354 | 11/1962 | Matulik | 95—10 |
| 3,134,027 | 5/1964 | Gray | 307—88.5 |

JOHN M. HORAN, *Primary Examiner.*